(12) United States Patent  (10) Patent No.: US 7,433,090 B2
Murray  (45) Date of Patent: Oct. 7, 2008

(54) PRINT/SCAN ASSEMBLY AND PRINTER APPARATUS AND METHODS INCLUDING THE SAME

(76) Inventor: David K. Murray, 1232 Telluride Cir., Lexington, KY (US) 40509

( * ) Notice: Subject to any disclaimer, the term of this patent is extended or adjusted under 35 U.S.C. 154(b) by 930 days.

(21) Appl. No.: 10/352,580

(22) Filed: Jan. 28, 2003

(65) Prior Publication Data

US 2004/0145783 A1  Jul. 29, 2004

(51) Int. Cl.
*H04N 1/04* (2006.01)
(52) U.S. Cl. ............... 358/474; 358/1.15; 358/497; 358/494; 358/501; 399/367
(58) Field of Classification Search ........... 358/474, 358/497, 496, 486, 1.12, 1.1, 501, 505, 1.15, 358/442, 402, 367
See application file for complete search history.

(56) References Cited

U.S. PATENT DOCUMENTS

| | | | |
|---|---|---|---|
| 5,018,025 A * | 5/1991 | Herloski ............ 358/471 |
| 5,532,825 A | 7/1996 | Lim et al. |
| 5,767,977 A | 6/1998 | Thelen et al. |
| 5,767,988 A | 6/1998 | Dobbs et al. |
| 5,833,381 A | 11/1998 | Kellogg et al. |
| 5,896,206 A | 4/1999 | Kellogg |
| 5,903,401 A * | 5/1999 | Tanaka et al. ............ 359/806 |
| 6,114,837 A | 9/2000 | Nakanishi |
| 6,160,642 A | 12/2000 | Mui et al. |
| 6,164,755 A * | 12/2000 | Yamamoto ............ 347/37 |
| 6,310,691 B2 * | 10/2001 | Cariffe ............ 358/1.1 |
| 6,353,485 B1 | 3/2002 | Kaneko |
| 6,462,839 B1 | 10/2002 | Short |
| 6,519,047 B1 * | 2/2003 | Ahn ............ 358/1.12 |
| 6,612,681 B2 * | 9/2003 | Hasegawa et al. ........ 347/22 |
| 6,690,494 B1 * | 2/2004 | Yamada ............ 358/497 |
| 6,828,995 B1 * | 12/2004 | Iwasaki et al. ........ 347/190 |
| 6,961,152 B1 * | 11/2005 | Watanabe et al. ........ 358/296 |
| 7,042,597 B2 * | 5/2006 | Wada ............ 358/472 |
| 7,151,622 B2 * | 12/2006 | Suzuki et al. ........ 358/498 |
| 2007/0024902 A1 * | 2/2007 | Kato ............ 358/1.15 |
| 2007/0109601 A1 * | 5/2007 | Mitani ............ 358/1.18 |

* cited by examiner

*Primary Examiner*—Edward L. Coles
*Assistant Examiner*—Negussie Worku (57) ABSTRACT

A printer apparatus includes a frame and a print/scan assembly. The print/scan assembly includes a carriage assembly movably mounted on the frame. The carriage assembly includes a printhead carriage and a scanner carriage. The printhead carriage is adapted to hold a printhead and the scanner carriage is adapted to hold a scanning assembly. The scanner carriage is joined to the printhead carriage for movement therewith as the carriage assembly moves relative to the frame. A printhead may be mounted on the printhead carriage for movement therewith. A scanning assembly may be mounted on the scanner carriage for movement therewith.

48 Claims, 8 Drawing Sheets

Fig. 10

PRINT/SCAN ASSEMBLY AND PRINTER APPARATUS AND METHODS INCLUDING THE SAME

FIELD OF THE INVENTION

The present invention relates to electronic printer apparatus and operating methods and, more particularly, to printer apparatus and methods adapted for both printing and scanning.

BACKGROUND OF THE INVENTION

Electronic printing apparatus are available including printing (e.g., inkjet printing) and scanning (i.e., electronic image capture) functionality in a common unit. Such apparatus may also serve as copiers by printing the scanned image. Commonly referred to as "multi-function printers" or "all-in-ones," such apparatus are often desirable because of their potential low cost, low space requirements and/or simplicity in use and set up as compared to separate printers and scanners.

In conventional inkjet printer/scanners, printing is accomplished using a printhead mounted on a printhead carriage. The printhead carriage is mounted on a frame such that the carriage can be reciprocated from side to side relative to the frame using a first drive system. A scanning unit is mounted on a second, scanner carriage. The scanner carriage is similarly mounted on the frame such that the scanner carriage can be reciprocated from side to side relative to the frame, independently of the printhead carriage, using a second drive system. Typically, the first and second drive systems each include a respective motor and a respective transmission assembly (e.g., belts, pulleys, lead screws, gears, etc.).

SUMMARY OF THE INVENTION

According to embodiments of the present invention, a printer apparatus includes a frame and a print/scan assembly. The print/scan assembly includes a carriage assembly movably mounted on the frame. The carriage assembly includes a printhead carriage and a scanner carriage. The printhead carriage is adapted to hold a printhead and the scanner carriage is adapted to hold a scanning assembly. The scanner carriage is joined to the printhead carriage for movement therewith as the carriage assembly moves relative to the frame. A printhead may be mounted on the printhead carriage for movement therewith. A scanning assembly may be mounted on the scanner carriage for movement therewith.

According to further embodiments of the present invention, a printer apparatus includes a frame, a printhead carriage movably mounted on the frame, a scanner carriage movably mounted on the frame, and a drive assembly. The printer apparatus is adapted such that the drive assembly is operable to move both the printhead carriage and the scanner carriage relative to the frame.

According to further embodiments of the present invention, a print/scan assembly for use in a printer apparatus including a frame includes a carriage assembly adapted to be movably mounted on the frame. The carriage assembly includes a printhead carriage adapted to hold a printhead and a scanner carriage adapted to hold a scanning assembly. The scanner carriage is joined to the printhead carriage for movement therewith as the carriage assembly moves relative to the frame.

According to method embodiments of the present invention, a method of moving a printhead and a scanning assembly of a print/scan assembly is provided. The print/scan assembly is on a frame and includes a printhead carriage and a scanner carriage. A printhead is mounted on the printhead carriage for movement therewith. A scanning assembly is mounted on the scanner carriage for movement therewith. The method includes moving the printhead carriage and the scanner carriage relative to the frame as a unit.

According to further method embodiments of the present invention, a method of moving a printhead and a scanning assembly is provided. The printhead and the scanning assembly are mounted on a frame. The method includes moving each of the printhead and the scanning assembly relative to the frame using a common drive assembly.

Objects of the present invention will be appreciated by those of ordinary skill in the art from a reading of the figures and the detailed description of the preferred embodiments which follow, such description being merely illustrative of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the relative sizes of regions or components may be exaggerated for clarity. It will be understood that when an element is referred to as being "on", "connected to", "joined to" or the like, it can be directly on, connected to, or joined to the other element or intervening elements may be present. When an element is referred to as being "directly on", "directly connected to", "directly joined to" or the like, there is no intervening element between the referenced elements.

With reference to FIGS. 1-5, a multi-function printer apparatus 100 according to embodiments of the present invention is shown therein. The apparatus 100 is adapted to print and scan images to and from suitable media. The apparatus 100 may also be adapted to copy (i.e., print an image scanned by the apparatus 100).

The apparatus 100 includes a frame 110, a carriage assembly 150 mounted on the frame 110, and a drive system 140 operable to move the carriage assembly 150 relative to the frame 110. Both a printhead 102 (FIGS. 2 and 3) and a scanning assembly 104 (FIG. 2) are mounted on the carriage assembly 150 so that they can be moved therewith relative to the frame 110, and thereby relative to a desired print media or scan media. Because the apparatus 100 uses a common carriage assembly for the printhead 102 and the scanning assembly 104, a common drive system may be used for each, which may provide significant reductions in cost. Moreover, the use of a common drive system may allow for improved control of the scanning operation. Also, a reduction in size of the apparatus 100 as compared to conventional combined printer/scanners may be achieved.

Figure 1:
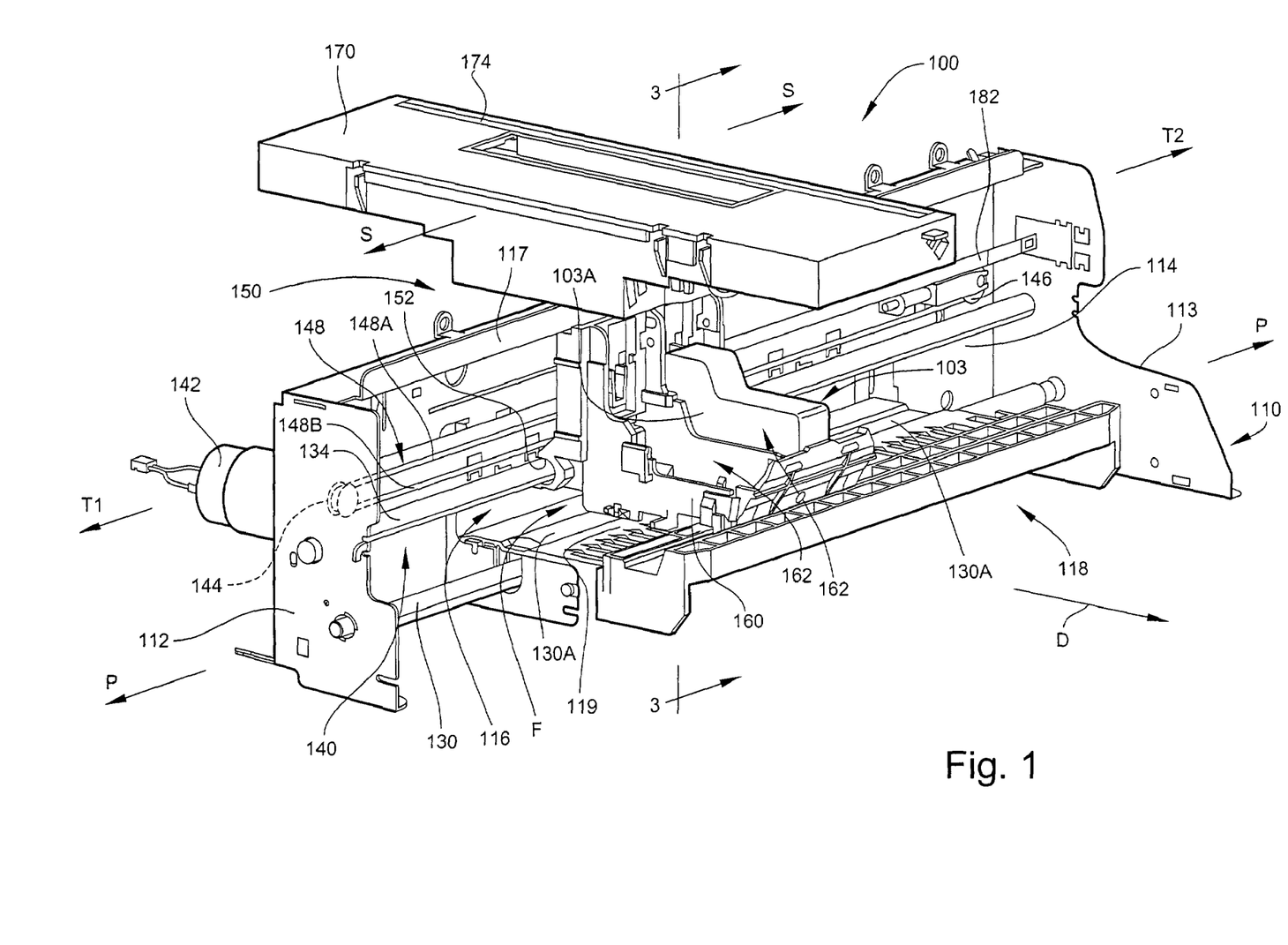
FIG. 1 is a perspective view of a printer apparatus according to embodiments of the present invention.
Figure 2:
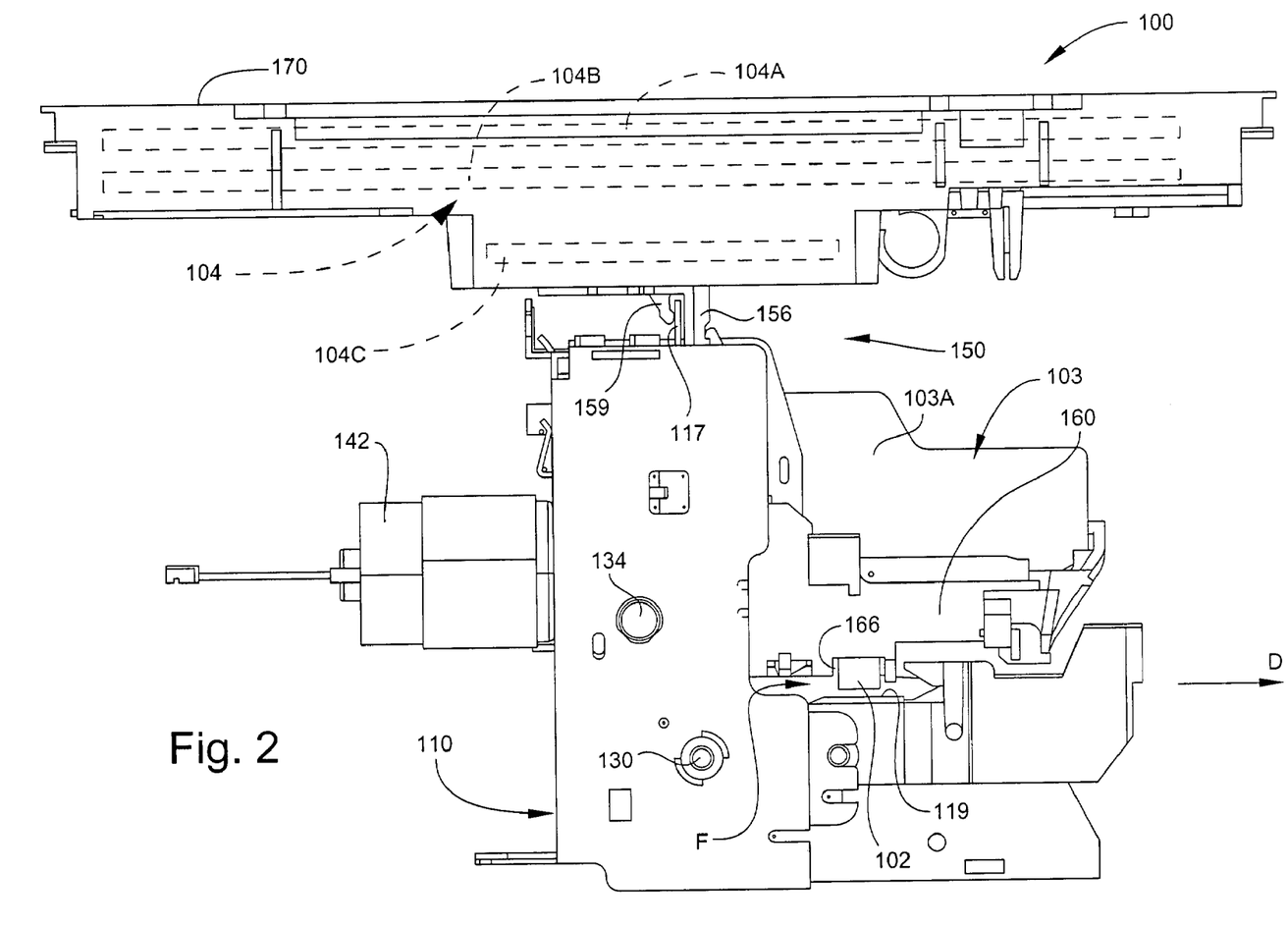
FIG. 2 is a side view of the printer apparatus of FIG. 1.

As best seen in FIG. 1, the frame 110 includes opposed side frame members or side walls 112, 113 and an intermediate frame member or rear wall 114 extending to and between the side walls 112, 113. An inlet slot 116 (FIGS. 1 and 3) is defined in the rear wall 114 to receive the desired print media, such as paper or transparency film in sheet or web form. The frame 110 further includes a platen 119 which, along with the printhead 102, defines an exit slot or gap 118.

A feed shaft 130 is rotatably mounted between the side walls 113, 114 and carries a pair of feed rollers 130A formed of a suitable material such as rubber. A suitable drive system (not shown) is provided to selectively rotate the feed shaft 130 to thereby draw the print media into the frame 110 and to transfer the print media through the inlet slot 116, between the printhead 102 and the platen 119 and out through the exit slot 118 generally along a media feed path F (FIGS. 1 and 2) in a direction D. A driven exit roller (not shown) may also be provided.

While a particular arrangement and configuration is illustrated in the drawings, the feed shaft 130, feed rollers 130A, feed shaft drive system, and frame 110 may be of any suitable construction. For example, conventional frames and feed systems may be employed.

A carriage guide rail 134 is mounted in the frame 110 such that the carriage guide rail 134 extends between the side walls 112, 113 and transversely to the feed direction D. Preferably, the carriage guide rail 134 extends substantially perpendicularly to the feed direction D. The outer surface of the carriage guide rail 134 is preferably substantially smooth and the rail 134 may be formed of steel or other suitable material.

A carriage drive system 140 is mounted on the frame 110 and includes a motor 142, a pair of pulleys 144, 146, and a belt 148. The pulleys 144, 146 may be toothed. The pulley 144 is affixed to an output shaft of the motor 142 and the pulley 146 is an idler pulley. The belt 148 is preferably an endless, toothed, rubber belt and has an upper reach 148A and a lower reach 148B. The motor 142 may be any suitable type of motor such as a DC motor or a stepper motor. However, a DC motor is preferred in some embodiments as discussed below.

Figure 3:
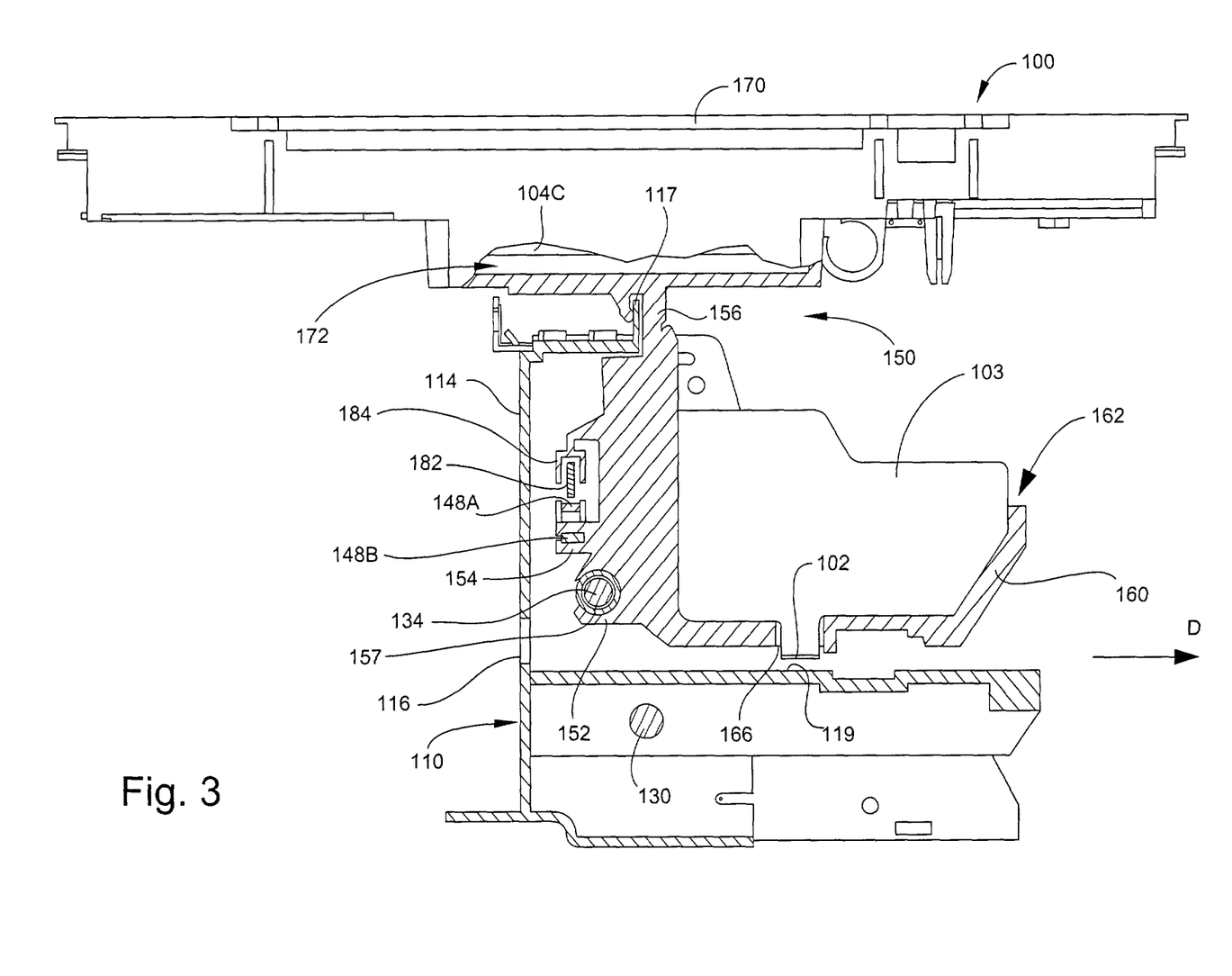
FIG. 3 is a fragmentary, cross-sectional view of the printer apparatus of FIG. 1 taken along the line 3-3 of FIG. 1.

The carriage assembly 150 is slidably mounted on the carriage guide rail 134. More particularly, the carriage assembly 150 includes a guide slot 152 that securely holds a bearing 157 (e.g., a brass slide bearing; FIG. 3). The bearing 157 slidably receives the carriage guide rail 134. A belt attachment portion 154 is affixed to the belt lower reach 148B. The carriage assembly 150 has a printhead carriage 160 and a scanner carriage 170. The printhead carriage 160 and the scanner carriage 170 are integrated or joined by a connecting portion 156 (FIGS. 2 and 3) extending therebetween. More particularly, the carriages 160, 170 and the connecting portion 156 are integrally and unitarily formed, for example, by molding. A guide flange 117 of the frame 110 is received between the connecting portion 156 and a projection 159 extending from the carriage assembly 150 to prevent the carriage assembly 150 from pivoting about the guide rail 134.

Accordingly, as will be more fully appreciated from the description below, the printhead carriage 160 and the scanner carriage 170 are permanently affixed to one another by the connecting portion 156 such that they may be moved as a single unit. Preferably, the portion 156 and the carriages 160, 170 are substantially rigidly joined so as to prevent undesirable flexure during operation of the apparatus 100.

The carriage assembly 150 may be formed of any suitable material. Preferably, the carriage assembly 150 is formed of a polymeric material or metal. More preferably, the carriage assembly 150 is formed of a polymeric material such as flame resistant ABS or polycarbonate or metal.

A pair of upwardly opening printhead cavities 162 are defined in the printhead carriage 160. The cavities 162 are each sized and configured to receive a respective printhead 102. For clarity, in the figures only one of the printheads 102 is illustrated. However, it will be appreciated by those of ordinary skill in the art that a printhead 102 may be disposed in each or either of the cavities 162. For example, as is conventional, one of the cavities 162 may hold a black ink printhead while the other of the cavities 162 may hold a multicolor printhead.

The printhead or printheads 102 may be of any suitable type and construction. According to certain preferred embodiments, the printhead 102 is an inkjet printhead such as a thermal inkjet printhead. That is, the printhead 102 may include a nozzle plate having a plurality of nozzles for controllably expelling (e.g., using electronic control) ink droplets onto the print media. The printhead 102 may form a part of a unitary inkjet cartridge 103 also including an ink reservoir 103A. Exemplary inkjet cartridges of this type include Product No. 10N0026 available from Lexmark International, Incorporated of Lexington, Ky. Each of the cavities 162 is preferably adapted to securely and releasably hold one of the inkjet cartridges 103, for example, using one or more flexible, resilient tangs, a latch mechanism or other suitable structures. Holes 166 in the printhead carriage 160 communicate with respective ones of the cavities 162 and are positioned to provide an unimpeded path between the respective printheads 102 and the printable media as the media is conveyed along the feed path F between the printhead 102 and the platen 119.

The printhead 102 is operatively connected to a print controller (not shown) such as a microprocessor forming a part of the apparatus 100. The print controller serves to control the printhead to print the desired image(s) on the print media. Suitable print controllers are well known to those of skill in the art.

The scanner carriage 170 includes a housing portion defining an interior cavity 172 (FIG. 3) and a slot 174 (FIG. 1) communicating with the cavity 172. The slot 174 has a length that extends transversely, and preferably perpendicularly, to the feed direction D. The scanning assembly 104 includes a lamp 104A (FIG. 2) in the cavity 172 adjacent the slot 174 and adapted to direct light onto a scan media through the slot 174, which light, modified by the image on the media, is reflected back from the media through the slot 174 to one or more mirrors 104B (FIG. 2) of the scanning assembly 104 also in the cavity 172. The mirrors 104B direct the reflected light to a scan sensor 104C (FIGS. 2 and 3) of the scanning assembly 104 also disposed in the cavity 172.

The scanning assembly 104 may be any suitable scanning assembly, and need not be configured in the manner described or shown herein. The scanning assembly 104 is operatively connected to a scan controller (not shown) such as a microprocessor forming a part of the apparatus 100. The scan controller serves to actuate the lamp and input and process signals from the scan sensor 104C corresponding to the scanned image. Suitable scan controllers are well known to those of skill in the art.

Figure 5:
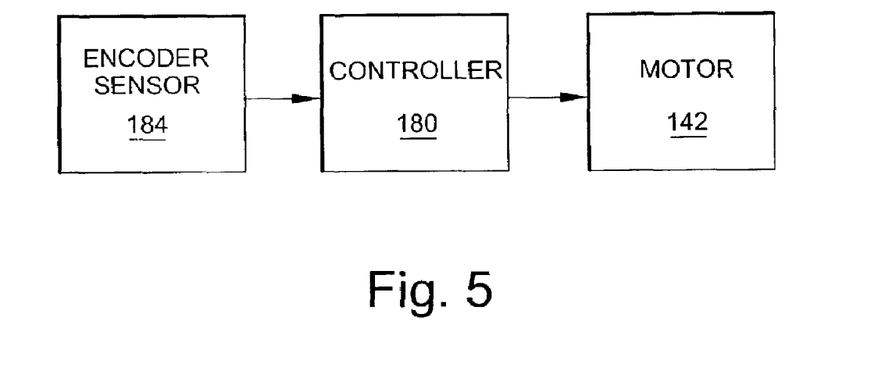
FIG. 5 is a block diagram representing a control feedback loop of the printer apparatus of FIG. 1.

An encoder strip 182 extends transversely (to the feed direction D) between the side walls 112, 113. An encoder sensor 184 (FIG. 3) is mounted on the carriage 150 and is positioned to read the encoder strip as the carriage assembly 150 moves along the length of the encoder strip 182. A controller 180, schematically illustrated in FIG. 5, is operatively connected to the motor 142 and the encoder sensor 184. The encoder strip 182 and the encoder sensor 184 may be any suitable encoder strip and sensor, such devices being well known in the art. The encoder strip 182 may include a translucent Mylar strip. In some embodiments, the encoder sensor 184 is an optical encoder sensor. The controller 180 may be any suitable type of controller. In some embodiments, the controller 180 is a digital signal process (DSP), application specific integrated circuit (ASIC) or CPU-based micro-controller.

Figure 4:
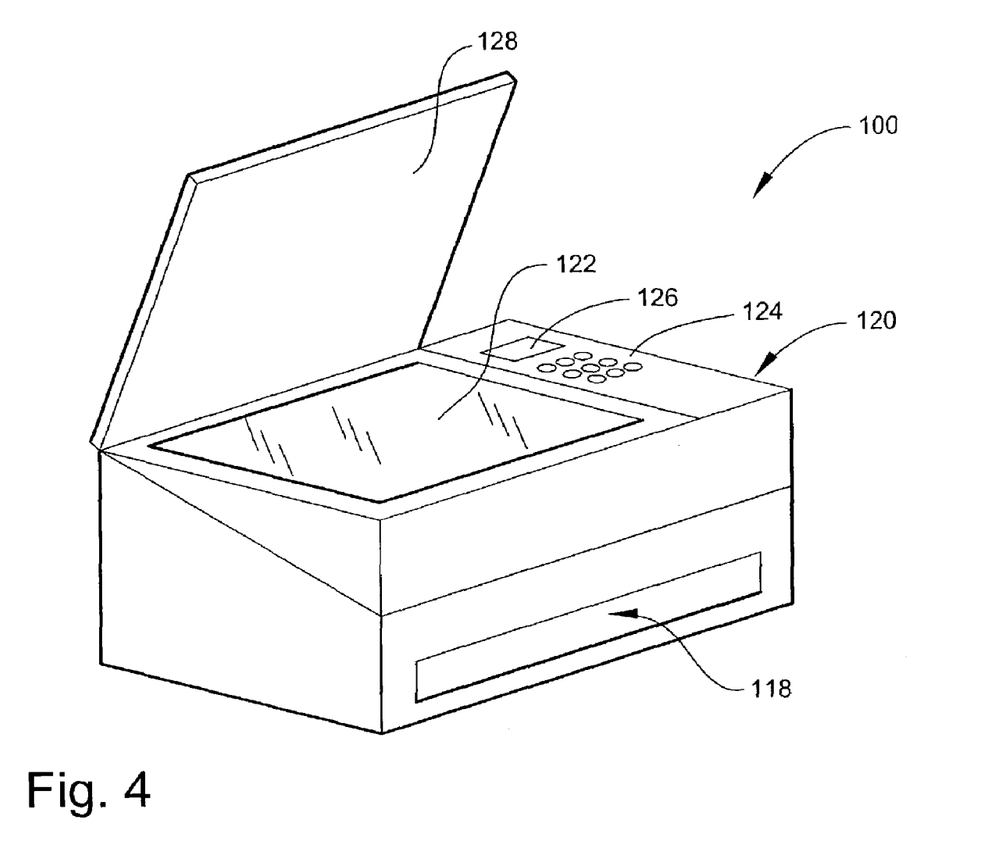
FIG. 4 is a perspective view of the printer apparatus of FIG. 1 further including a cover.

With reference to FIG. 4, a cover 120 surrounds at least a portion of the components described above. The cover 120 includes a transparent platen 122 overlying the path of the slot 174. An operator input device (e.g., a keypad) 124 and a display (e.g., an LCD) 126 are provided on the cover 120. The cover 120 includes a hingedly mounted shutter 128 to selectively cover the platen 122 and the media to be scanned.

In use, the motor 142 is operable to move the carriage assembly 150 linearly back and forth (directions T1 and T2, respectively) along a carriage axis T1-T2 extending along the carriage guide rail 134. The carriage axis T1-T2 is transverse, and preferably perpendicular, to the direction D. More particularly, the motor 142 may be alternatingly reversed to rotate the pulley 144 in alternating directions and thereby drive the lower belt reach 148B from side to side in directions parallel to the carriage axis T1-T2. The carriage assembly 150, being attached to the lower belt reach 148B, is thereby likewise linearly reciprocated from side to side.

In this manner, the printhead carriage 160 and the scanner carriage 170 of the carriage assembly 150 are moved (more particularly, linearly reciprocated from side to side) relative to the frame 110 as a unit or in tandem (i.e., in partnership or conjunction). As a result, the printhead 102 is linearly reciprocated along a transverse print axis P-P, which extends parallel to the carriage axis T1-T2, to define a print zone. In known manner, the feed system may be controlled to index the print media along the feed path F in the feed direction D so that sequential segments of the media are covered by the printhead 102 as the printhead 102 is actuated to deposit ink.

Likewise, the scanner carriage 170 and thereby the scanning assembly 104 are linearly reciprocated along a transverse scan axis S-S, which extends parallel to the carriage axis T1-T2, to define a scan zone. The slot 174 is thereby caused to traverse beneath the platen 122 such that the scanning assembly 104 can capture an image from a scan media disposed on the platen 122.

Typically, the print and scan operations described above are not executed concurrently.

Notably, the apparatus provides both printing and active scanning functions while requiring only a single carriage drive system (i.e., the printhead carriage 160 and the scanner carriage 170 are driven or moved by the same motor). The second drive system (e.g., motor and driver, drive belt, transmission pulleys or gears, drive shaft, carriage bearing, etc.) conventionally required to drive the scanner carriage is eliminated. Accordingly, the costs associated with the scanner drive system are eliminated. Moreover, the space requirements (especially height) of the scanner drive system are reduced or eliminated, allowing for a smaller overall apparatus.

As noted above, in some embodiments the motor 142 is preferably a DC motor. With reference to FIG. 5, the controller 180 can accurately monitor and position the carriage assembly 150 using the motor 142 and the encoder sensor 184, which (in cooperation with the encoder strip 182) provide a robust closed loop feedback control system. A DC motor used in combination with an encoder may provide substantially more accurate and rapid control of a printhead during printing. Because the scanning assembly 104 is also carried on the carriage assembly 150, the precision and other attributes provided by the DC motor/encoder combination may likewise be provided in the scanning operation. Thus, whereas scanners (including those combined with printers and using DC motor/encoder systems) at least at and below certain price points typically have been provided with stepper motors due to cost concerns, in apparatus according to the present invention, the benefits of a DC motor/encoder system may be obtained without proportional additional expense. Other types of position sensors and position indicating or determining systems may be employed in place of or in addition to the encoder strip and sensor.

Figure 6:
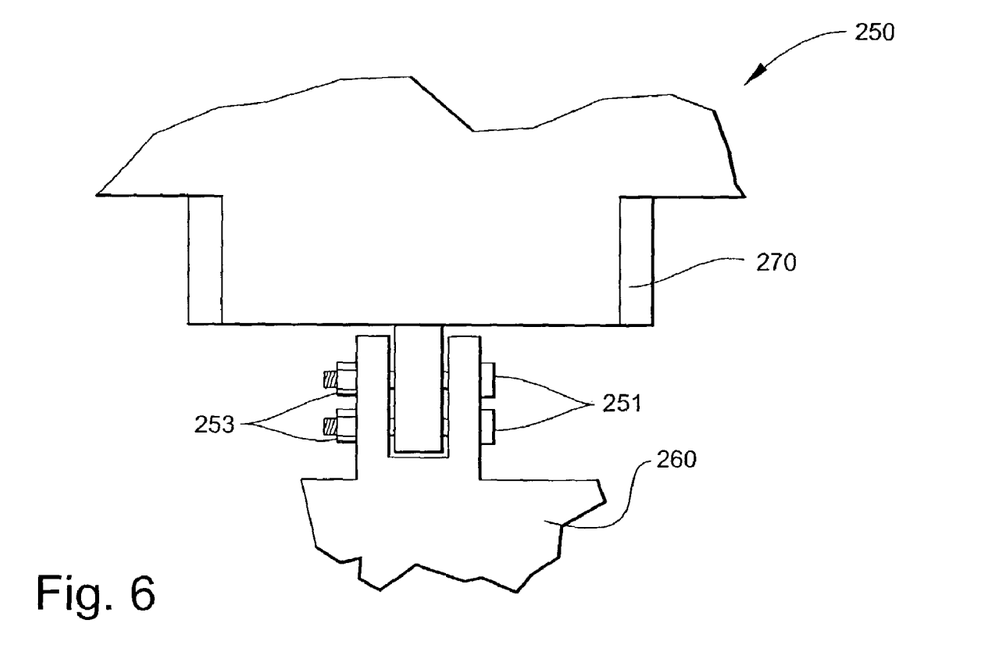
FIG. 6 is an enlarged, fragmentary, side view of a carriage assembly of a printer apparatus according to further embodiments of the present invention.

Other constructions may be employed to affix (typically rigidly) the scanner carriage to the printhead carriage. For example, with reference to FIG. 6, the carriage assembly 150 may be replaced with a carriage assembly 250 as shown therein. The carriage assembly 250 corresponds to the carriage assembly 150 except that the printer carriage 160 and the scanner carriage 170 are not unitarily formed. Rather the carriages 260 and 270 are individual units securely joined by bolts 251 and nuts 253.

Figure 7:
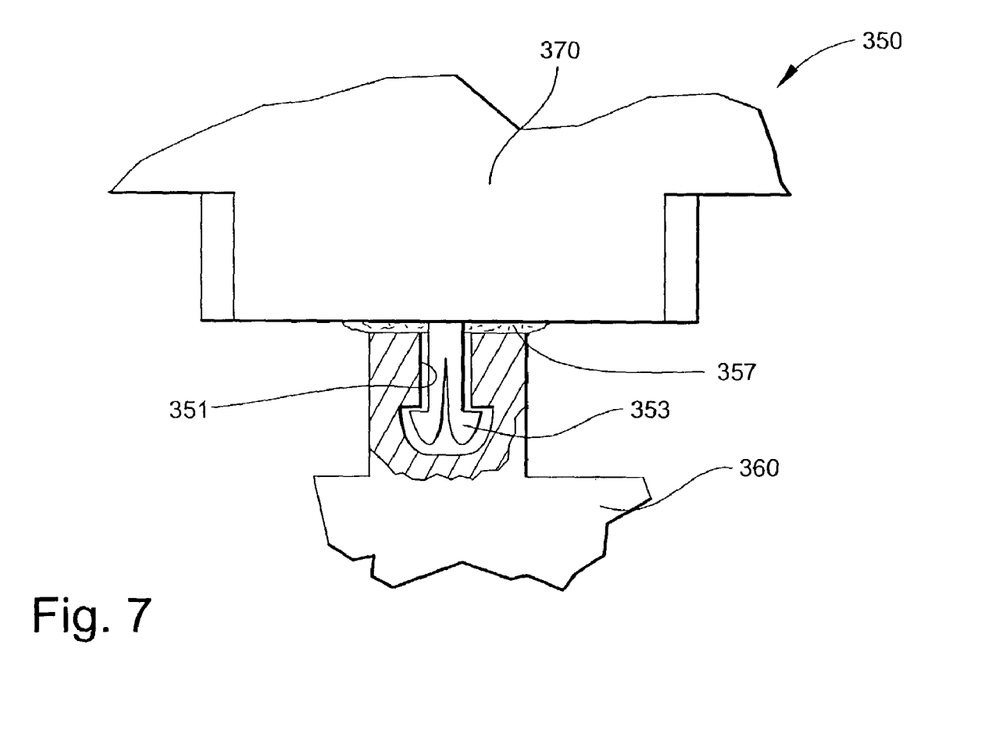
FIG. 7 is an enlarged, fragmentary, side view of a carriage assembly of a printer apparatus according to further embodiments of the present invention.

As a further alternative, and with reference to FIG. 7, the carriage assembly 150 may be replaced with a carriage assembly 350 corresponding to the carriage assembly 150 except that the printhead carriage 360 and the scanner carriage 370 are individual units securely joined by a socket 351 (formed in the carriage 360) and a snap insert 353 (formed on the carriage 370), which together form an interlock assembly, and a layer of adhesive 357.

It will be appreciated that these and other suitable methods for joining the printhead carriage and the scanner carriage may be used in combination or individually. For example, the adhesive 357 may be used without the snap system.

Figure 8:
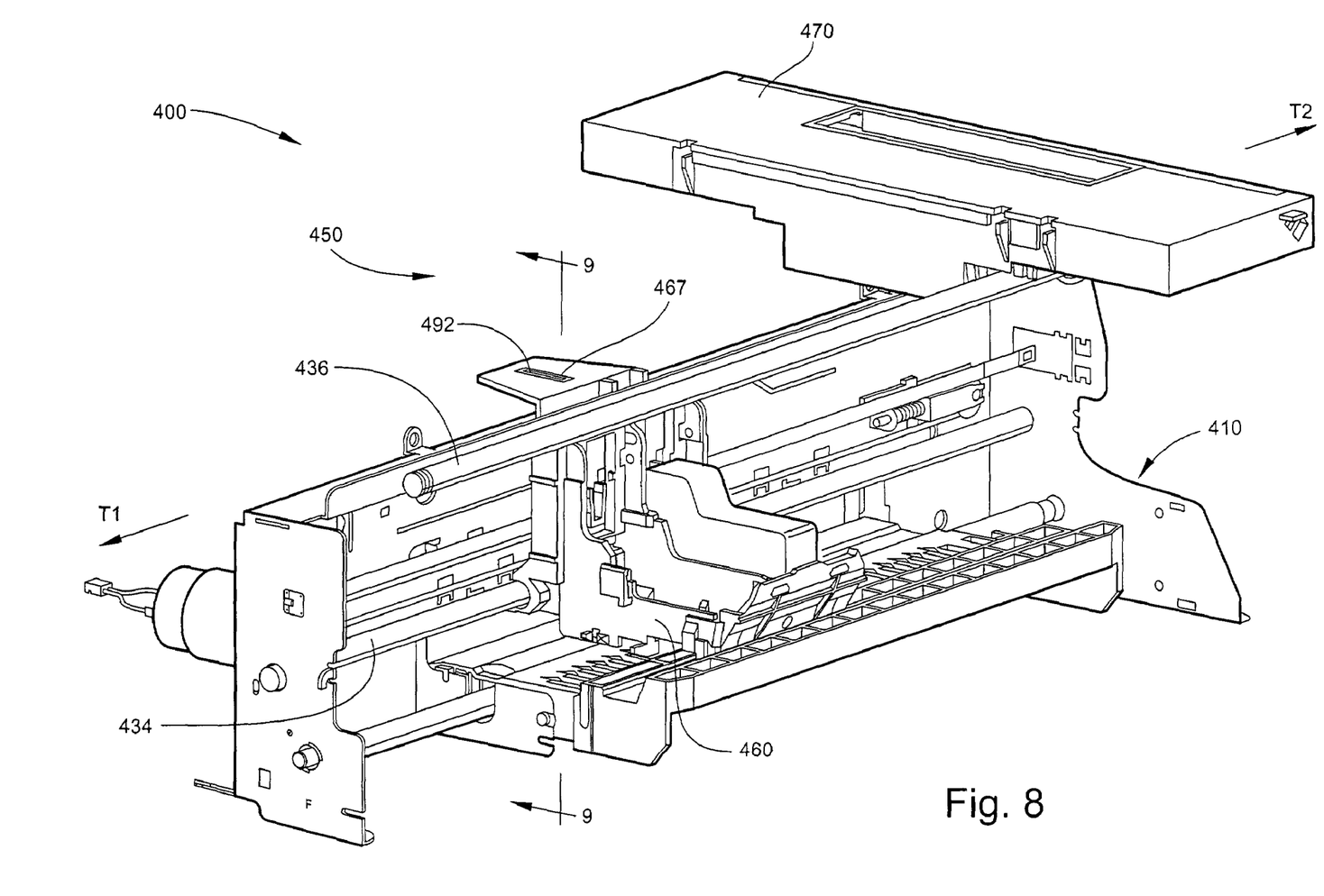
FIG. 8 is a perspective view of a printer apparatus according to further embodiments of the present invention.
Figure 9:
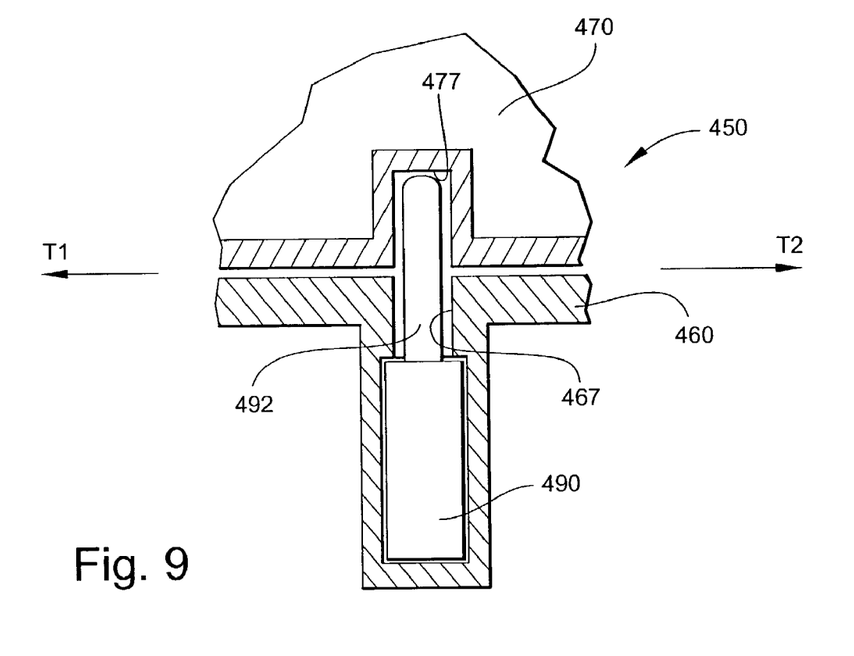
FIG. 9 is an enlarged, fragmentary, cross-sectional view of the printer apparatus of FIG. 8 taken along the line 9-9 of FIG. 8, but wherein a printer carriage and a scanner carriage thereof are coupled.

With reference to FIGS. 8 and 9, an apparatus 400 according to further embodiments of the present invention is shown therein. The apparatus 400 corresponds to the apparatus 100 except as follows. Whereas in the apparatus 100 the printhead carriage 160 and the scanner carriage 170 are permanently joined for combined movement by the connecting portion 156, the apparatus 400 includes a carriage assembly 450 including a printhead carriage 460 and a scanner carriage 470 adapted to be selectively coupled, decoupled and re-coupled to and from one another. The carriages 460 and 470 may correspond to the carriages 160 and 170, respectively, except as discussed below and as illustrated. In addition to the carriage guide rail 434, a second carriage guide rail 436 is provided. The scanner carriage 470 includes a guide slot that slidably receives the carriage guide rail 436.

Turning to the carriage assembly 450 in more detail and as best seen in FIG. 9, the printhead carriage 460 includes a slot 467 housing a solenoid 490. The solenoid 490 has a latch member or piston 492 and is operably connected to the controller (not shown) such that the piston 492 can be selectively extended and retracted. The scanner carriage 470 includes a receiving slot 477 sized and configured to receive a portion of the piston 492. The piston 492 and the slots 467, 477 are relatively configured such that, when the piston 492 is extended into the slot 477, the piston 492 serves as a latch to prevent relative movement of the printhead carriage 460 and the scanner carriage 470 along the carriage axis T1-T2. The piston 492 may be of any suitable shape.

Figure 10:
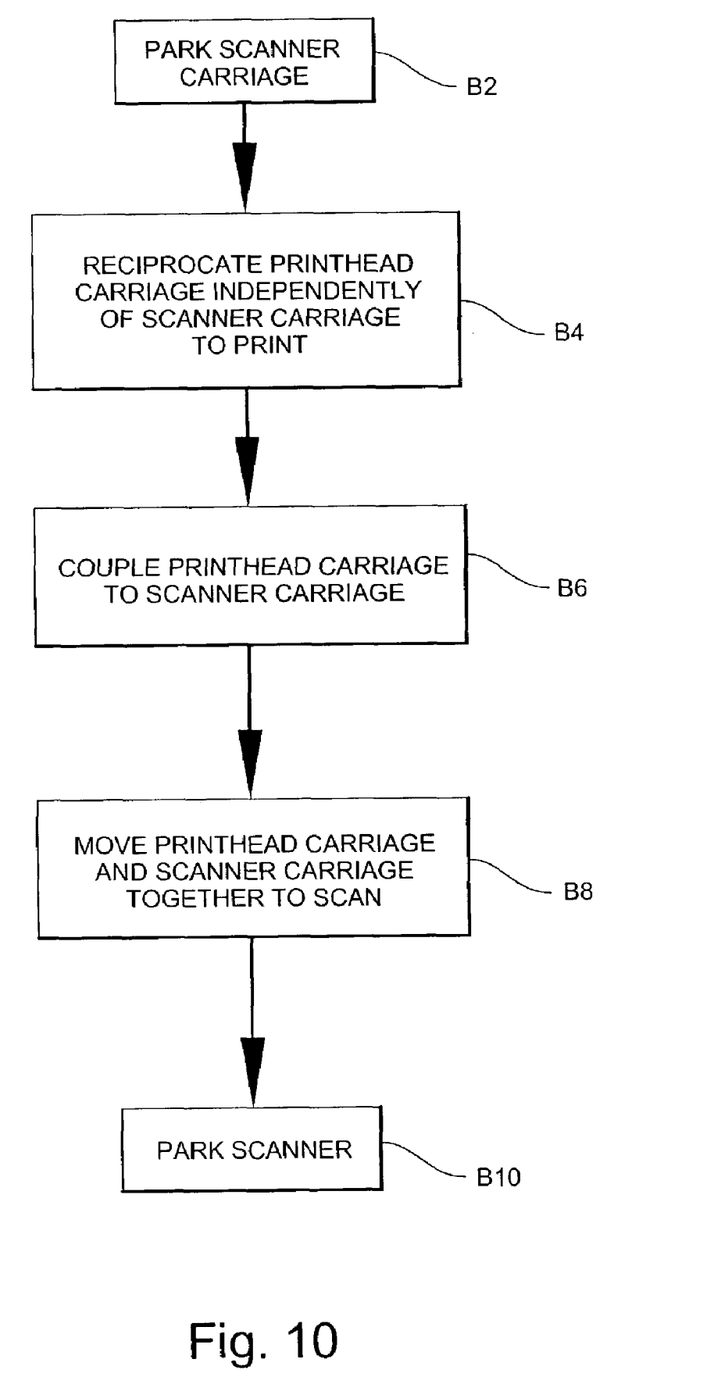
FIG. 10 is a flow chart representing methods for printing and scanning according to embodiments of the present invention.

The apparatus 400 operates in the same manner as the apparatus 100 except as follows. When the scanning function is not in use, the printhead carriage 460 is decoupled from the scanner carriage 470 by retracting the piston 492 and the scanner carriage 470 is "parked" or stored off to the one side of the frame 410 (Block B2, FIG. 10) as shown in FIG. 8. The printhead carriage 460 and the printhead are then reciprocated relative to the frame independently of the scanner carriage 470 for printing (Block B4, FIG. 10). Preferably, when parked, the scanner carriage 470 is configured and/or positioned such that it does not interfere with the printhead carriage 460 as the latter reciprocates during printing operations.

When the scanning function is requested, the controller moves the printhead portion 460 to a position beneath the scanner carriage 470 such that the slots 467 and 477 are vertically aligned. The controller then actuates the solenoid 490 to extend the piston 492 into the slot 477. The carriages 460 and 470 are thereby coupled (or re-coupled) (Block B6, FIG. 10) as shown in FIG. 9. The controller then moves the printhead carriage 460 and thereby the scanner carriage 470 along the carriage guide rails 434, 436 as needed to execute the scanning function (Block B8, FIG. 10).

When the scanning function is completed and/or a print function is requested, the controller may move the printhead carriage 460 and thereby the scanner carriage 470 to the side of the frame 410 such that the portion 470 is returned to its parked position. The controller then actuates the solenoid 490 to retract the piston 492 from the slot 477, thereby decoupling the printhead carriage 460 from the scanner carriage 470 (Block B10, FIG. 10). The foregoing steps may be repeated and employed in various combinations to effect printing and scanning as desired.

The apparatus 400 may be used instead of the apparatus 100 where it is desired to selectively reduce the reciprocating mass on the carriage associated with the printhead. In particular, the durability of the printing apparatus and the rate of inkjet printing may be enhanced by lightening the mass conveyed with the printhead during the relatively high speed print operations.

Figure 11:
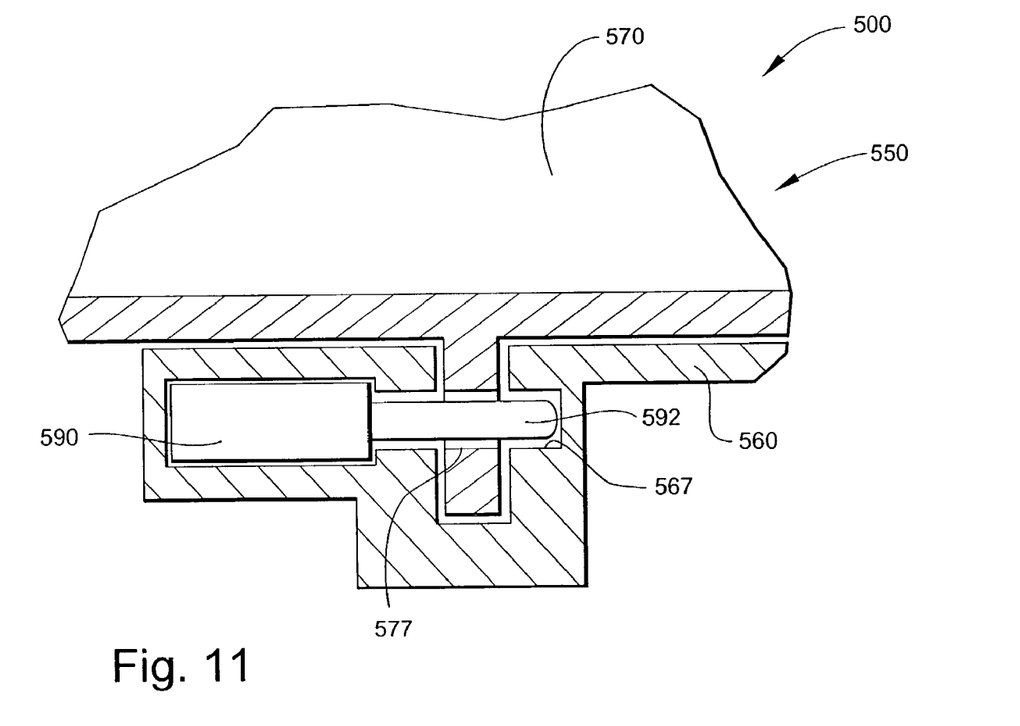
FIG. 11 is an enlarged, fragmentary, cross-sectional view of a carriage assembly of a printer apparatus according to further embodiments of the present invention.

With reference to FIG. 11, an apparatus 500 according to further embodiments of the present invention is shown therein. The apparatus 500 corresponds to the apparatus 400 except that, in place of the piston 492, the apparatus 500 includes a slot 567 (in the printhead carriage 560), a slot 577 (in the scanner carriage 570) and a solenoid 590 having a piston 592 configured such that the piston 592 is extended and retracted horizontally and transversely to the carriage axis T1-T2 (in the view of FIG. 11, the axis T1-T2 extends into and out of the paper) to couple and decouple the portions 560 and 570.

According to some embodiments of the present invention, the methods include and the apparatus 100, 200, 300, 400, 500 are capable of reciprocating the printheads at a rate of at least 5 inches/second, and according to some embodiments at least 30 inches/second, relative to the respective frames.

While latch systems including slots and solenoids are described above, any suitable system or method for selectively coupling and decoupling the carriages 460, 470 or the carriages 560, 570 may be employed. For example, the solenoids may be replaced with a pin or key raised and lowered by a motor and gearing, a ratchet mechanism or switch, and/or cooperative magnets.

While the scanner carriages of the carriage assemblies 150, 250, 350, 450, 550 have been shown and described as including housings that substantially surround various components of a scanning assembly, scanner carriages in accordance with the present invention may be otherwise configured. For example, the scanner carriage may provide an open cavity or platform adapted to support or hold the scanning assembly components. Likewise, the printhead carriage of carriage assemblies in accordance with the present invention may be otherwise configured.

While embodiments of the present invention have been described above in relation to inkjet printers, the invention may include or form a part of other types of printers. For example, the printhead or printheads may be piezoelectric impact (dot matrix) or thermal resistive printheads. The printhead or printheads may be permanently or semi-permanently mounted on the printhead carriage. Ink may be supplied to permanently or semi-permanently mounted printheads using a replaceable ink cartridge.

While the printer/scanner apparatus described above utilize linear, reciprocating printhead movement in combination with a feed system for indexing the print media, other types and combinations of movement may be employed. For example, a belt type (e.g., feed belt), or vacuum mechanism or system may be used.

While a carriage drive system using a motor, pulley and belt is described above, other drive systems may be used to move the carriage. For example, the aforedescribed drive system may be replaced or supplemented with a drive system including a lead screw, gears, a magnetic linear motor, rack and pinion and/or spring and solenoid.

While the apparatus according to embodiments of the present invention as described above utilize scanning assemblies located above their respective printheads, other configurations may be used. In such case, the relative placement of the printhead carriage (e.g., the printhead carriage 160) and the corresponding scanner carriage (e.g., the scanner carriage 170) may be altered or reversed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A printer apparatus comprising:
a) a frame; and b) a print/scan assembly including a carriage assembly movably mounted on the frame, the carriage assembly including:
   i) a printhead carriage adapted to hold a printhead; and
   ii) a scanner carriage adapted to hold a scanning assembly that electronically captures images of a media during use; and
   iii) wherein the scanner carriage is joined to the printhead carriage for movement therewith as the carriage assembly moves relative to the frame, and the printhead carriage is positioned beneath the scanner carriage.

2. The printer apparatus of claim 1 including a single drive system operable to move both the printhead carriage and the scanner carriage relative to the frame while maintaining the printhead carriage beneath the scanner carriage.

3. The printer apparatus of claim 2 wherein: the frame includes a carriage guide rail; the carriage assembly is slidably mounted on the carriage guide rail; and the drive system is operable to linearly reciprocate the carriage assembly along the rail.

4. The printer apparatus of claim 2 including a print media feed system operable to transport print media along a feed path in a feed direction, wherein the drive system is operative to linearly reciprocate the carriage assembly along a carriage axis which is transverse to the feed direction.

5. The printer apparatus of claim 2 wherein the drive system includes a motor.

6. The printer apparatus of claim 5 wherein the drive system further includes a belt connecting the motor to the carriage assembly.

7. The printer apparatus of claim 5 including: a position sensor adapted to indicate the position of the carriage assembly as the carriage assembly moves relative to the frame; and a controller connected to the position sensor and the motor, the controller being operative to control the motor; wherein the motor and the position sensor provide a closed feedback control loop.

8. The printer apparatus of claim 7 wherein the motor is a DC motor.

9. The printer apparatus of claim 7 further including an encoder strip extending along a path of travel of the carriage assembly, wherein the position sensor is an encoder sensor mounted on the carriage assembly for movement therewith and adapted to read the encoder strip.

10. The printer apparatus of claim 1 wherein: the frame includes a carriage guide rail; and the carriage assembly is slidably mounted on the carriage guide rail.

11. The printer apparatus of claim 1 wherein the printhead carriage and the scanner carriage are joined to one another such that they may be selectively coupled and decoupled from one another.

12. The printer apparatus of claim 11 including a latch system including a latch member mounted on a first one of the printhead carriage and the scanner carriage, wherein: the latch system is operable to selectively engage the latch member with a second one of the printhead carriage and the scanner carriage to thereby couple the printhead carriage and the scanner carriage; and the latch system is further operable to selectively disengage the latch member from the second one of the printhead carriage and the scanner carriage to thereby decouple the printhead carriage and the scanner carriage.

13. The printer apparatus of claim 11 including a drive system operable to move one of the printhead carriage and the scanner carriage relative to the frame, wherein the other of the printhead carriage and the scanner carriage is non-driven.

14. The printer apparatus of claim 11 wherein: the frame includes first and second carriage guide rails; the printhead carriage is slidably mounted on the first carriage guide rail; and the scanner carriage is slidably mounted on the second carriage guide rail.

15. The printer apparatus of claim 1 including a printhead mounted on the printhead carriage for movement therewith.

16. The printer apparatus of claim 15 wherein the printhead is an inkjet printhead.

17. The printer apparatus of claim 16 including an inkjet cartridge mounted on the printhead carriage, the inkjet cartridge including the printhead and an ink reservoir.

18. The printer apparatus of claim 1 including a scanning assembly mounted on the scanner carriage for movement therewith.

19. The printer apparatus of claim 18 wherein the scanning assembly includes a scan sensor.

20. The printer apparatus of claim 19 wherein the scanning assembly further includes a lamp and a mirror.

21. The printer apparatus of claim 20 wherein the scanner carriage includes a housing defining a cavity and a slot, wherein the scan sensor, the lamp and the mirror are disposed in the cavity, the lamp is configured to direct light through the slot to a scan media, and the mirror is configured to receive light through the slot from the scan media.

22. The printer apparatus of claim 1 including: a printhead mounted on the printhead carriage for movement therewith; and a scanning assembly mounted on the scanner carriage for movement therewith.

23. A printer apparatus comprising:
a) a frame;
b) a printhead carriage movably mounted on the frame;
c) a scanner carriage for capturing electronic images movably mounted on the frame, wherein the printhead carriage is joined together and positioned beneath the scanner carriage; and
d) a drive assembly operable to move the joined printhead carriage and the scanner carriage relative to the frame while maintaining the printhead carriage beneath the scanner carriage.

24. The printer apparatus of claim 23 wherein the drive assembly is operable to move the printhead carriage and the scanner carriage as a vertically fixed unit.

25. The printer apparatus of claim 23 including a print media feed system operable to transport print media along a feed path in a feed direction, wherein the drive system is operative to linearly reciprocate the carriage assembly along a carriage axis which is transverse to the feed direction.

26. The printer apparatus of claim 23 wherein the drive assembly includes a motor, the printer apparatus further including: a position sensor adapted to indicate the position of the printhead carriage and the scanner carriage as the printhead carriage and the scanner carriage move relative to the frame; and a controller connected to the position sensor and the motor, the controller being operative to control the motor; wherein the motor and the position sensor provide a closed feedback control loop.

27. The printer apparatus of claim 26 wherein the motor is a DC motor.

28. The printer apparatus of claim 26 further including an encoder strip extending along a path of travel of the printhead, wherein the position sensor is an encoder sensor mounted for movement with the printhead carriage and adapted to read the encoder strip.

29. The printer apparatus of claim 23 including: a printhead mounted on the printhead carriage for movement therewith; and a scanning assembly mounted on the scanner carriage for movement therewith.

30. A print/scan assembly for use in a printer apparatus including a frame, the print/scan assembly comprising a carriage assembly adapted to be movably mounted on the frame, the carriage assembly including:
   a) a printhead carriage adapted to hold a printhead; and
   b) a scanner carriage adapted to hold a scanning assembly that electronically captures images of a media during use;
   c) wherein the scanner carriage is joined to the printhead carriage for movement therewith as the carriage assembly moves relative to the frame and the printhead carriage and scanner carriage are substantially vertically aligned.

31. The print/scan assembly of claim 30 further including: a printhead mounted on the printhead carriage for movement therewith; and a scanning assembly mounted on the scanner carriage for movement therewith.

32. A method of moving a printhead and a scanning assembly of a print/scan assembly on a frame, the print/scan assembly including a printhead carriage, a printhead mounted on the printhead carriage for movement therewith, a scanner carriage, and a scanning assembly that electronically captures images of a media during use mounted on the scanner carriage for movement therewith, the method comprising:
positioning the printhead carriage beneath the scanner carriage; and moving the printhead carriage and the scanner carriage relative to the frame as a joined unit while maintaining the printhead carriage beneath the scanner carriage.

33. The method of claim 32 wherein the step of moving the printhead carriage and the scanner carriage includes using a motor to move both the printhead carriage and the scanner carriage.

34. The method of claim 33 further including: determining a position of the printhead carriage and the scanner carriage relative to the frame using a position sensor; and controlling the motor based on the position of the printhead carriage and the scanner carriage as determined using the position sensor.

35. The method of claim 32 further including the steps of: a) decoupling the printhead carriage from the scanner carriage; and thereafter b) moving the printhead carriage relative to the frame independently of the scanner carriage.

36. The method of claim 35 wherein the step of decoupling the printhead carriage from the scanner carriage includes parking the scanner carriage.

37. The method of claim 35 wherein the step of decoupling the printhead carriage from the scanner carriage includes disengaging a latch member coupling the printhead carriage to the scanner carriage.

38. The method of claim 35 including printing on a print media using the printhead during the step of moving the printhead carriage relative to the frame independently of the scanner carriage.

39. The method of claim 38 wherein the step of moving the printhead carriage relative to the frame independently of the scanner carriage includes moving the printhead along a print axis, said method further including, during the step of printing on the print media, feeding the print media through the frame in a feed direction transverse to the print axis.

40. The method of claim 35 further including, following the step of moving the printhead carriage relative to the frame independently of the scanner carriage, the steps of: a) re-coupling the printhead carriage with the scanner carriage; and thereafter b) further moving the printhead carriage and the scanner carriage relative to the frame as a unit.

41. The method of claim 40 wherein the step of re-coupling the printhead carriage to the scanner carriage includes engaging a latch member between the printhead carriage and the scanner carriage.

42. The method of claim 40 including scanning a scan media using the scanning assembly during the step of further moving the printhead carriage and the scanner carriage relative to the frame as a unit.

43. A method of moving a printhead and a scanning assembly, each of the printhead and the scanning assembly being mounted on a frame, the method comprising: positioning the printhead beneath the scanning assembly;
   joining the printhead and the scanning assembly to one another for joint movement while maintaining the printhead beneath the scanning assembly during movement; and
   moving each of the printhead and the scanning assembly relative to the frame using a common drive assembly.

44. The method of claim 43 wherein the step of moving the printhead and the scanning assembly includes moving the printhead and the scanning assembly relative to the frame as a vertically fixed unit.

45. The method of claim 43 wherein the step of moving the printhead and the scanning assembly includes using a motor to move both the printhead and the scanning assembly.

46. The method of claim 45 further including: determining a position of the printhead and the scanning assembly relative to the frame using a position sensor; and controlling the motor based on the position of the printhead and the scanning assembly as determined using the position sensor.

47. The method of claim 46 wherein the motor is a DC motor.

48. The method of claim 43 including feeding a print media along a feed path in a feed direction, wherein the step of moving the printhead and the scanning assembly includes linearly reciprocating the printhead and the scanning assembly along a print axis which is transverse to the feed direction.

* * * * *